(12) United States Patent
Picker

(10) Patent No.: US 12,319,853 B2
(45) Date of Patent: Jun. 3, 2025

(54) MULTI-PHASIC POLYMER BLEND FOR ADHERING AN OUTER EDGE BANDING LAYER TO A SUBSTRATE

(71) Applicant: Ultra Tech Extrusions of Tennessee, Inc., Rocky Top, TN (US)

(72) Inventor: Cyrille Picker, Rocky Top, TN (US)

(73) Assignee: Ultra Tech Extrusions of Tennessee, Inc., Rocky Top, TN (US)

( * ) Notice: Subject to any disclaimer, the term of this patent is extended or adjusted under 35 U.S.C. 154(b) by 0 days.

(21) Appl. No.: 18/209,707

(22) Filed: Jun. 14, 2023

(65) Prior Publication Data

US 2023/0399547 A1    Dec. 14, 2023

Related U.S. Application Data

(60) Division of application No. 17/177,484, filed on Feb. 17, 2021, now Pat. No. 11,746,261, which is a (Continued)

(51) Int. Cl.
*C09J 7/35*       (2018.01)
*A47B 96/20*    (2006.01)
(Continued)

(52) U.S. Cl.
CPC ............. *C09J 7/35* (2018.01); *A47B 96/201* (2013.01); *B29C 65/02* (2013.01);
(Continued)

(58) Field of Classification Search
None
See application file for complete search history.

(56) References Cited

U.S. PATENT DOCUMENTS 4,956,423 A * 9/1990 Lee .................. C08L 79/08
525/434
5,763,516 A    6/1998 Godfrey
(Continued)

FOREIGN PATENT DOCUMENTS

DE    1621814 A1    5/1973
DE    10104296 A1   8/2002
(Continued)

OTHER PUBLICATIONS

"Honeywell A-C 5120, 5135, 5150 and 5180 Ethylene-Acrylic Acid Copolymers", Honeywell International Inc., Oct. 31, 2016, 1-2.
(Continued)

*Primary Examiner* — Michael N Orlando
*Assistant Examiner* — Abhishek A Patwardhan
(74) *Attorney, Agent, or Firm* — Blanchard Horton PLLC

(57) ABSTRACT

A multi-phasic polymer blend for energy activated edge banding adhesion to a substrate is described. While the blend may be used for adhering edge banding to straight substrates, the blend is preferred for adhering edge banding to contoured substrates. The outer, hard, structural layer of the edge banding is formed from a polypropylene component. The polypropylene component at least includes polypropylene and an optional energy adsorber. The inner adhesion layer of the edge banding is formed from a multi-phasic polymer blend that bonds the outer layer of the edge banding to the substrate. The multi-phasic polymer blend at least includes a polyamide component, a polyolefin component, and a modified polypropylene component. Both the outer and inner layers forming the edge banding may be tinted to conform or contrast with the color of the finished substrate.

47 Claims, 5 Drawing Sheets

Related U.S. Application Data division of application No. 16/162,757, filed on Oct. 17, 2018, now Pat. No. 10,954,412, which is a continuation-in-part of application No. 14/961,255, filed on Dec. 7, 2015, now abandoned.

(60) Provisional application No. 62/112,489, filed on Feb. 5, 2015.

(51) Int. Cl.

| | | |
|---|---|---|
| *B29C 65/00* | (2006.01) | |
| *B29C 65/02* | (2006.01) | |
| *B29C 65/14* | (2006.01) | |
| *B29C 65/16* | (2006.01) | |
| *B29C 65/48* | (2006.01) | |
| *B29C 65/74* | (2006.01) | |
| *C09J 5/06* | (2006.01) | |
| *C09J 7/24* | (2018.01) | |
| *C09J 123/08* | (2006.01) | |
| *C09J 123/26* | (2006.01) | |
| *C09J 177/00* | (2006.01) | |
| *C09J 177/02* | (2006.01) | |

(52) U.S. Cl.
CPC ...... *B29C 65/1412* (2013.01); *B29C 65/1612* (2013.01); *B29C 65/48* (2013.01); *B29C 65/741* (2013.01); *B29C 65/7419* (2013.01); *B29C 66/0244* (2013.01); *C09J 5/06* (2013.01); *C09J 7/243* (2018.01); *C09J 123/0869* (2013.01); *C09J 123/26* (2013.01); *C09J 177/00* (2013.01); *C09J 177/02* (2013.01); *C09J 2423/10* (2013.01); *C09J 2423/106* (2013.01); *C09J 2477/00* (2013.01)

(56) References Cited

U.S. PATENT DOCUMENTS

| 5,998,524 | A | 12/1999 | Srinivasan et al. |
|---|---|---|---|
| 6,306,954 | B1 | 10/2001 | Nishikawa et al. |
| 6,872,458 | B1 | 3/2005 | Rudd et al. |
| 8,603,610 | B2* | 12/2013 | Kramer ............... B29C 66/7392 |
| 9,565,943 | B2 | 2/2017 | Kramer et al. |
| 10,954,412 | B1 | 3/2021 | Picker |
| 11,746,261 | B2 | 9/2023 | Picker |
| 2003/0003296 | A1 | 1/2003 | Dries et al. |
| 2003/0159775 | A1* | 8/2003 | Tsui ....................... C09J 151/06 524/502 |
| 2003/0176555 | A1 | 9/2003 | Watanabe et al. |
| 2019/0100645 | A1* | 4/2019 | Kito ....................... C08L 23/12 |

FOREIGN PATENT DOCUMENTS

| DE | 10300146 A1 | 7/2003 |
|---|---|---|
| EP | 0562166 A1 | 9/1993 |
| EP | 0773096 A2 | 5/1997 |
| EP | 0858886 A2 | 8/1998 |
| EP | 0888908 A2 | 1/1999 |
| EP | 1163864 A1 | 12/2001 |
| EP | 1800813 A2 | 6/2007 |
| EP | 1852242 B1 | 2/2009 |
| WO | 9306995 A1 | 4/1993 |
| WO | 2009112259 A1 | 9/2009 |
| WO | 2010079014 A2 | 7/2010 |
| WO | 2017169813 A1 | 10/2017 |

OTHER PUBLICATIONS

"MSDS Platamid HX 2544", https://www.arkema.com/global/en/products, Nov. 27, 2012, 1-7.
"MSDS Platamid HX 2592 T", https://www.arkema.com/global/en/products, May 1, 2013, 1-8.
"Platamid HX 2544 OEM Campus Datasheet", HTTP://www.campusplastics.com—Arkema, Jul. 21, 2017, 1-2.
"Platamid HX 2592", https://www.arkema.com/global/en/products, Jul. 21, 2017, 1.
"Platamid HX 2592 PA OEM Campus Datasheet", http://www.campusplastics.com—Arkema, Jul. 21, 2017, 1-2.
"Platamid NX 2544", https://www.arkema.com/global/en/products, Jul. 21, 2017, 1.
"Polypropylene—Products and Properties America", www.braskem.com, Dec. 31, 2013, 1-16.
Chaigneau, Richard , "Platamid Copolyamides Specialty Hot Melt Adhesive", Platamid by Arkema, Dec. 31, 2014, 1-16.

* cited by examiner

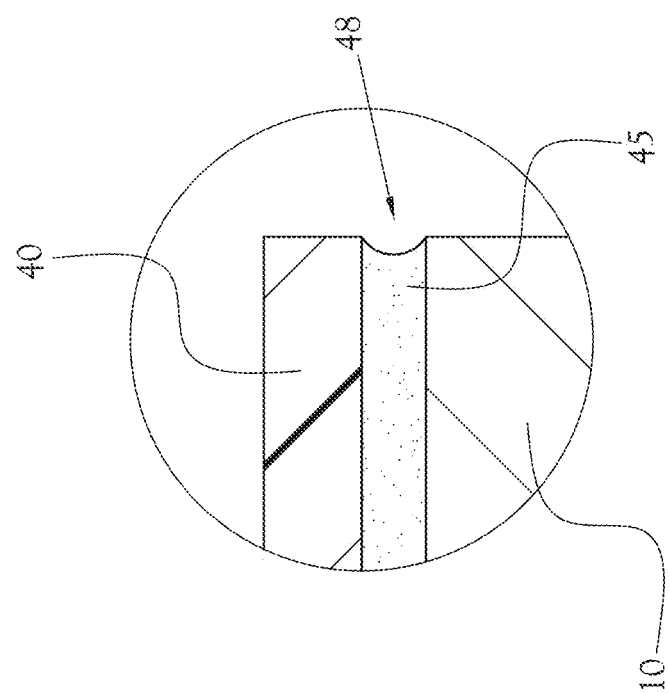
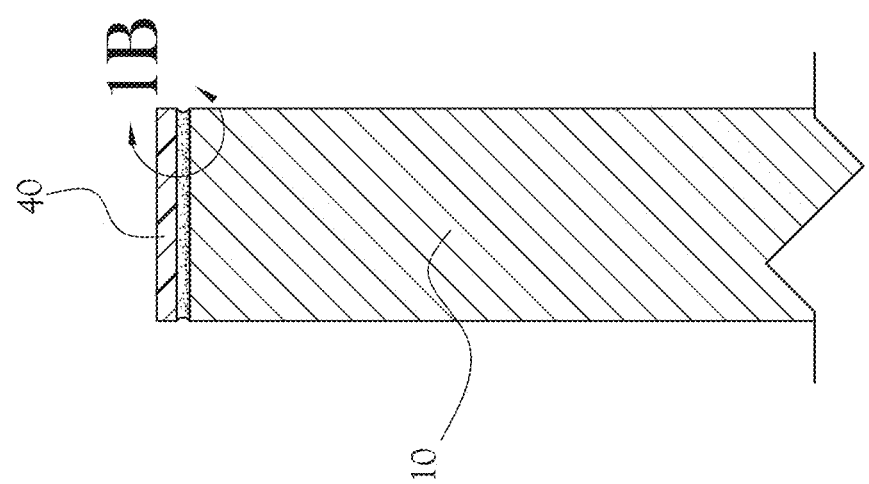

MULTI-PHASIC POLYMER BLEND FOR ADHERING AN OUTER EDGE BANDING LAYER TO A SUBSTRATE

CROSS-REFERENCE TO RELATED APPLICATIONS

This Application is a divisional of U.S. application Ser. No. 17/177,484, having a filing date of Feb. 17, 2021, entitled "Method of Adhering Extended Melt-Temp Range and Low Energy Absorptive Edge Banding Adhesive System Edge Banding", which is a divisional of U.S. application Ser. No. 16/162,757, having a filing date of Oct. 17, 2018, entitled "Extended Melt-Temp Range and Low Energy Absorptive Edge Banding Adhesive System and Edge Banding", which is a continuation-in-part of U.S. application Ser. No. 14/961,255, having a filing date of Dec. 7, 2015, entitled "Adhesive and Main Body Formulas for Energy Activated Edge Band", which claims the benefit of U.S. Provisional Patent Application Ser. No. 62/112,489, filed Feb. 5, 2015, the entirety of each is incorporated herein by reference.

BACKGROUND

Edge banding is used as a protective and decorative covering for the edge of composite, plywood, and similar substrates where the body surface or surfaces of the substrate are covered with a decorative high-(HPL) or low-pressure (LPL) laminate surface, such as Formica. This type of construction is often used in the production of furniture and cabinetry where the front vertical edge of a board is edge banded and the top horizontal surface is covered by the laminate. Both the edge banding and the surface laminate are generally secured to the board with adhesives.

FIG. 1A and the close-up representation in FIG. 1B illustrate the application of conventional edge banding to the edge of a board where the conventional edge banding relies on a polypropylene hot-melt adhesive inner layer 45 and a polypropylene outer layer 40. When bending around curves, the outer layer 40 slightly pulls away from wood surface to leave gaps (not shown) between the inner layer 45 and the wood surface 10, before the inner layer 45 sufficiently cools and hardens. The pulling away of the outer layer 40 of the edge banding arises at least in part because the outer layer 40 is inherently "stiff" and attempts to "restraighten" after being bent around the curve. This pulling away of the outer layer 40 from the wood surface 10 produces visible gaps (not shown) between the edge banding and the curve of the wood surface 10.

In addition to gaps, the pulling away of the outer layer 40 in combination with shrinkage of the polypropylene hot-melt adhesive inner layer 45 during cooling create a concave surface in the inner layer 45 between the outer layer 40 and the wood surface 10 that may be referred to as a "gutter" 48, thus producing the "gutter effect". These gapping and guttering effects become evident when the curves in the substrate that the edge banding is being applied to have radiuses of approximately 30 millimeters (mm) and below, and tend to be pronounced if applied to radiuses of 25 mm and below when the edge banding is thicker than 2.7 mm. The gapping and guttering effects become especially pronounced at these radii when the edge banding is 3 mm or greater in thickness.

This gapping and guttering of conventional hot-melt edge banding adhesives result in a visual shadow line between the edge banding and the substrate edge. The shadow line is visible in the "gutter", and becomes deeper and darker in areas where gapping also occurs.

The softer and the more elastic, and thus "sticky" the conventional hot-melt adhesive forming the inner layer of the edge banding, the more gapping and guttering that will be observed, especially around corners and other contours. In addition to the visible shadows, gaps and gutters in the conventional hot-melt adhesive become dirt- and germ-catching areas that are not readily cleaned. Furthermore, the softer and/or stickier the conventional hot-melt adhesive after cooling, the more dirt and germs are captured, and the less likely surface cleaning will effectively remove the entrained dirt and germs.

The stickiness of the conventional hot-melt adhesives also results in waste inner layer adhesive being deposited onto the surface of the laminate as the high-speed rotary cutting tool used to provide a more finished look to the edge banded substrate board becomes coated in the sticky hot-melt adhesive and ejects the material onto the top of the substrate laminate, thus requiring cleaning and removal with a solvent. The production line also must be routinely stopped, and the cutting tool and associated surfaces cleaned when adhesive build-up on the tool becomes excessive, thus contributing to production inefficiency.

In contrast to hot-melt adhesives, energy-activated edge banding adhesive formulations are often designed specifically for laser energy emitting contour edge banding application machines. Contour edge banding machines permit the application of edge banding to contours, such as curves and corners of varying radii. While contour edge banding machines can apply edge banding to contours, the ability of the contour machines to follow curves and corners necessitates the elimination of at least a portion of the pressure rollers and other devices that straight application edge banding machines use to apply significant force against the edge banding after adhesion to better adhere the inner adhesive layer with the substrate edge.

One attempt at overcoming the deficiencies of older hot-melt edge banding adhesives for contour machine use is found in EP 1,163,864 B1 where the energy activated inner bonding layer is a soft layer of the same polymer type as the outer layer. In fact, the "adhesive inner layer" of the '864 is formed from the outer layer without a separate adhesive. Thus, the "inner bonding layer" of the edge banding is a laser-softened, "adhesive" version of the outer layer formed during application of the edge banding to the wood-based panel. A known disadvantage of such conventional "softened outer layer adhesion" techniques is that the edge banding is either unsatisfactorily fastened to the wood-based panel or the cured outer layer is too soft.

EP 1,852,242 B1 addresses the unsatisfactory fastening of the edge banding to the contours of the wood-based panel with various singular component hot-melt adhesives. For an example outer polypropylene layer edge banding, the '242 patent discusses the use of either amorphous poly-alpha olefin (APAO) hot melt or thermoplastic polyurethane (TPU) hotmelt adhesives to adhere the outer polypropylene layer of the edge banding to the panel. However, after cooling, these adhesives remain sticky and thus collect visible dirt that cannot be readily removed, while also having gapping and guttering issues at smaller contour radii.

U.S. Pat. No. 8,603,610 addresses the gapping and guttering around contours and the stickiness issues with a meltable inner layer formed from "a grafted copolymer" that "is a maleic anhydride grafted polypropylene". While the inner layer adhesive of the '610 patent addresses the "cured sticky dirt collector" and gapping/guttering issues of the EP '242 patent adhesive, the adhesive system of the '610 patent introduces the disadvantages of a high melting temperature and a narrow effective energy input window.

Specifically, the adhesive system of the '610 patent routinely requires melt temperatures of at least 140 degrees Celsius, thus requiring approximately 48 Joules/cm$^2$ of energy to melt. However, if the energy input drops to less than about 48 Joules/cm$^2$ during application of the edge banding to radii, gapping can become pronounced as the inner layer does not melt enough to have sufficient time to flow and eliminate gapping between the outer layer and the furniture panel. Furthermore, burning of the resins forming the inner and/or outer layers of the edge banding can occur if more than about 50 Joules/cm$^2$ is applied by the contour edge banding machine when applying the edge banding to the radii. Such burning is especially problematic if the machine slows down the feed rate of the edge banding, such as in the context of making a turn around a corner of the board. While the specific 48 and 50 Joules/cm$^2$ numerical values may vary on different contour edge banding machines and under different environmental factors, the ~2 Joules/cm$^2$ energy input window, thus the "effective energy input window" remains constant.

Due to the extremely narrow effective energy input window of ~2 Joules/cm$^2$, and thus melt temperature range, required to prevent gapping on the low end and burning on the high end, maleic anhydride grafted polypropylene edge banding adhesive systems often lack manufacturing reproducibility. For example, inconsistent finished product may result from changes in environmental factors, such as temperature and humidity, of both the manufacturing floor and the panel during application of the edge banding to the panel. As the effective energy input window for the maleic anhydride grafted polypropylene adhesive systems are so narrow, inconsistencies can arise from a specific panel having a higher or lower than expected moisture content and/or temperature when fed into the edge banding machine. For example, a higher than expected moisture content or a lower than expected temperature of a specific panel can result in gapping as the same applied energy was insufficient to reach the ~48-50 Joule/cm$^2$ window for the adhesive. Similarly, a lower than expected moisture content or a higher than expected temperature of a specific panel may result in burning of the edge banding at the same applied energy.

As can be seen from the above description, there is an ongoing need for simple and efficient materials and methods for bonding edge banding to substrates without gaps, guttering, or stickiness in the cured adhesive layer that uses less energy over a broader range of environmental factors.

SUMMARY

In one aspect, a multi-phasic polymer blend for adhering an outer edge banding layer to a substrate is described. The blend includes a polyamide component comprising first and second polyamide resins, where the second polyamide resin is a random copolymer including at least one of lactam and amino acid functional groups in the monomers used to form the resin; a polyolefin component; and a modified polypropylene component.

In another aspect, an edge banding for the edge of a substrate is described. The edge banding includes an inner adhesive layer including a polyamide component including first and second polyamide resins, where the second polyamide resin has a strong peak at the 1650 cm$^{-1}$ wavenumber, but lacks a strong peak at the 1550 cm$^{-1}$ wavenumber in the FTIR spectra; a polyolefin component; a modified polypropylene component; and an outer structural layer including a polypropylene component comprising as least one polypropylene resin, where the inner adhesive layer contacts the outer structural layer.

In another aspect, a furniture board for an article of furniture is described. The board includes a substrate having a top horizontal surface, a bottom horizontal surface, and a front vertical edge; an edge banding having an inner adhesive layer adhered to the front vertical edge and an outer structural layer adhered to the inner adhesive layer; where the inner adhesive layer includes a polyamide component comprising first and second polyamide resins, where the second polyamide resin is a random copolymer including at least one of lactam and amino acid functional groups in the monomers used to form the resin; a polyolefin component; a modified polypropylene component; and where the outer structural layer includes a polypropylene component comprising as least one polypropylene resin, where the inner adhesive layer contacts the outer structural layer and the substrate.

In another aspect, a method of adhering edge banding to an edge of a substrate is described. The method includes heating an inner adhesive layer and an outer structural layer of an edge banding, the inner adhesive layer in contact with the outer structural layer, where the inner adhesive layer includes a polyamide component comprising a first polyamide resin and a second polyamide resin, a polyolefin component, a modified polypropylene component comprising a first modified polypropylene component and a second polypropylene component, and where the outer structural layer includes a polypropylene component comprising at least one polypropylene resin; forming a heated inner adhesive layer and a heated outer structural layer of the edge banding; contacting a substrate edge with the heated inner adhesive layer; and adhering the heated inner adhesive layer to the substrate edge.

Other systems, methods, features and advantages of the invention will be, or will become, apparent to one with skill in the art upon examination of the following figures and description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description.

FIG. 1A is a sectional representation of a wood composite substrate with conventional edge banding.

FIG. 1B is an enlarged representation of a portion of the wood composite substrate with the conventional edge banding shown in FIG. 1A, showing the edge banding in greater detail, and particularly showing the "gutter effect" arising from conventional edge banding adhesion.

DETAILED DESCRIPTION

Figure 2B:
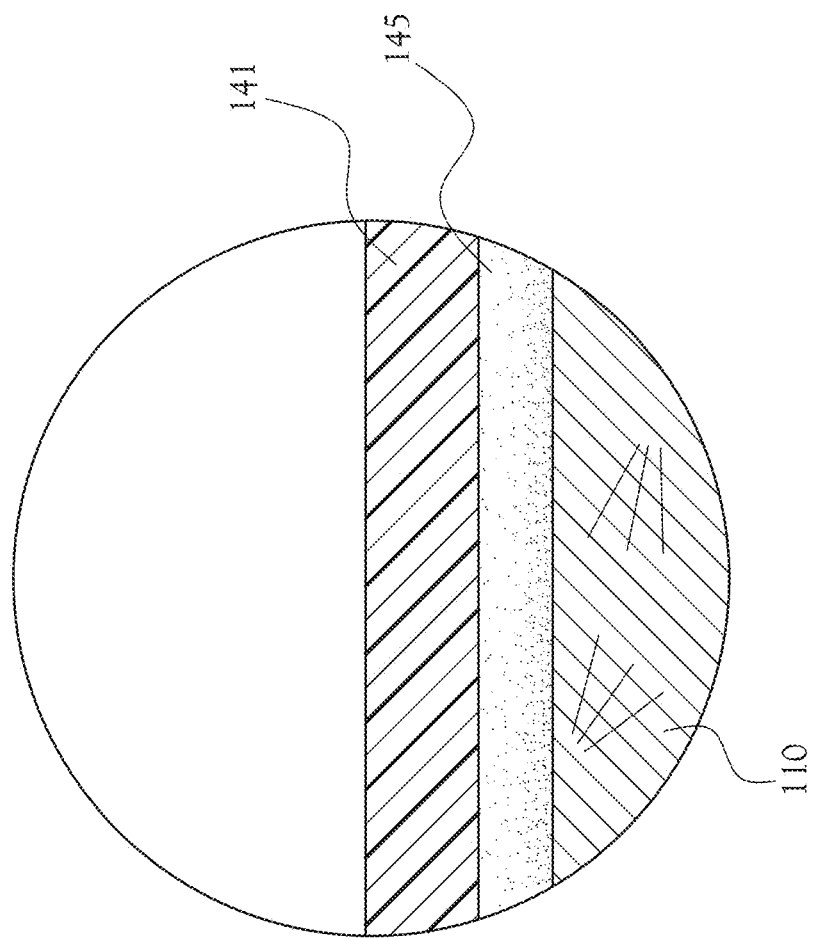
FIG. 2B is an enlarged representation of a portion of the wood composite surface member with the edge banding shown in FIG. 2A, showing the outer layer propylene component and the inner layer multi-phasic blend lacking gapping or guttering.

A multi-phasic polymer blend for energy activated edge banding adhesion to a substrate is described. While the blend may be used for adhering edge banding to straight substrates, the blend is preferred for adhering edge banding to contoured substrates. The outer, hard, structural layer of the edge banding is formed from a polypropylene component. The polypropylene component at least includes polypropylene and an optional energy adsorber. The inner adhesion layer of the edge banding is formed from a multi-phasic polymer blend that bonds the outer layer of the edge banding to the substrate. The multi-phasic polymer blend at least includes a polyamide component, a polyolefin component, and a modified polypropylene component. Both the outer and inner layers forming the edge banding may be tinted to conform or contrast with the color of the finished substrate.

The edge banding may be adhered with a heat source including hot air, plasma, and/or radiation in the infrared (IR) or ultraviolet (UV) wavelengths. IR irradiation may arise at a narrow wavelength range, such as from a diode laser, or at a relatively broad wavelength range, such as from IR lamps and other non-laser sources. Preferred contour edge banding machines are equipped with both narrowband and broadband IR sources, permitting the use of both narrowband and broadband IR energy adsorbers.

The substrate may be wood, wood composite, medium density fiberboard (MDF), wood fiber board, porous composites, and the like. The substrate includes an edge to which the edge banding is adhered and top and bottom surfaces on either side of the edge.

While providing adhesion between an edge of the substrate and the outer layer of the edge banding, the described multi-phasic polymer blend of the inner layer mimics the hardness, lack of stickiness, look, and feel of the outer layer while preventing separation of the outer layer from the substrate edge of the finished product during temperature change. These are important considerations for an inner adhesion layer, as unlike in many conventional edge banding applications, the multi-phasic polymer blend remains visible between the substrate and the outer, structural layer of the edge banding. Maintaining adhesion during extreme temperature change of the finished product is quite unexpected from an adhesion layer that looks and feels like the outer layer of the edge banding.

Outer Edge Banding Layer

The outer edge banding layer includes a polypropylene component including at least one polypropylene resin. Optionally, at least one energy adsorber is included in the polypropylene component. The polypropylene resin of the polypropylene component is preferably a polypropylene homopolymer having a flexural modulus from 1,000 MPa to 3,500 MPa, preferably from 1,300 MPa to 3,200 MPa, under the ASTM D-790 test method; a deflection temperature of 70 to 80 degrees Celsius at approximately 1800 kPa and a deflection temperature of 110 to 140 degrees Celsius at approximately 450 kPa; a melt volume-flow rate of 6 to 9 g/10 min, under the ASTM D-1238 test method; and a density of approximately 1 under the ASTM D-790 test method. Examples of such polypropylene homopolymers are sold under the brand names PRIMAFLEX™, as available from Plastic Solutions, Inc., Milton GA; FOO6EC2, as available from Braskem, Philadelphia, PA; and P9G1Z-047, as available from Flint Hills, Houston, TX. While the physical characteristics of the polypropylene resin can vary somewhat in relation to these values, the selected polypropylene resin forms a tough plastic on cooling with good deflection temperature performance.

The polypropylene component forming the outer layer preferably includes at least one energy adsorber that converts absorbed energy to heat during the application process that adheres the multi-phasic polymer blend and thus the outer layer of the edge banding to the substrate. The energy adsorber can absorb energy at one or more desired wavelengths, such as IR or UV, with broadband adsorption in the IR spectrum being preferred. IR lamps and other non-laser IR sources are preferred to provide broadband IR to the energy adsorber of the polypropylene component of the outer edge banding layer.

The broadband IR energy adsorber for the polypropylene component forming the outer layer of the edge banding may be selected from mica, calcium carbonate, silica, and talc, with talc being preferred. Suitable talc for use as the energy adsorber for the polypropylene component has a small grain diameter and preferably is maintained at a low moisture content when combined with the polypropylene resin. The broadband IR energy adsorber also is selected to provide the desired malleability to the polypropylene component, and thus the outer layer of the edge banding. While it would be possible to replace the broadband IR energy adsorber with a narrowband energy adsorber and a laser, this is not a preferred construction from a cost perspective.

When the broadband IR energy adsorber is talc, which is a strong adsorber of broad-spectrum IR, the talc constitutes from 18% to 30%, preferably from 21% to 26%, and more preferably from 22% to 24% by weight of the polypropylene component forming the outer layer. Conventional edge banding either omits strong energy adsorbers from the outer layer or includes less. Within these composition limits, the weight percent of talc may be adjusted based on the grade of polypropylene with the understanding that lower than desired percentages of talc may reduce the ability of the outer layer to wrap around tighter curves without gapping and the smoothness of the tooled outer layer, while higher than desired percentages of talc may increase the stress whitening around tighter curves as brittleness of the outer layer polypropylene component will increase.

The outer edge banding layer formed by the polypropylene component is preferably from 1 millimeter (mm) to 5 mm, more preferably from 1 to 3 mm in thickness. Thus, preferably 1 mm to 5 mm of the polypropylene component resides outside the inner multi-phasic polymer blend to form the largest visible portion of the edge banding.

Inner Edge Banding Layer

The multi-phasic polymer blend at least includes a polyamide component, a polyolefin component, and a modified polypropylene component. The polyamide component of the multi-phasic polymer blend includes at least two different polyamide resins. The polyolefin component includes at least one polyolefin resin. For use with contour machines, the polyolefin component preferably also includes at least one narrowband IR energy adsorber. The modified polypropylene component includes at least one, but preferably two different modified polypropylene resins. The multi-phasic polymer blend also may include other constituents to provide additional melt temperature control and viscosity modification.

The polyamide component of the multi-phasic blend including the at least two different polyamide resins has a melt temperature from 98 degrees Celsius to 108 degrees Celsius, preferably from 100 degrees Celsius to 106 degrees Celsius, and more preferably from 102 degrees Celsius to 104 degrees Celsius under the ISO 11357-1/-3 standard. The polyamide component has a melt volume-flow rate from 43 to 53 cm$^3$/10 min (160 degrees Celsius; 2.16 kg), preferably from 45 to 50 cm$^3$/10 min under the PSI Method ID 906 Rev. 8 standard, which is congruent with the ASTM D1238013 Procedure A standard, as determined with a Tinius Olsen MP 1200 extrusion plastometer, as available from Tinius Olsen TMC, Horsham, PA. The polyamide component at least includes a first polyamide resin having diamine and dicarboxylic acid functional groups in the monomers used to form the first polyamide resin, and a second polyamide resin including functional groups of biological origin, thus non-petroleum based, in the monomers used to form the second polyamide resin.

The polyamide component of the multi-phasic blend has a flexural modulus of 185 MPa with a standard deviation of approximately 30 MPa or ±16%. The flexural modulus was determined according to SGS PSI Method ID 9431 Rev. 6 with a test based on ASTM D790-17 Procedure A. The analysis was conducted with an MTS Insight 30 test frame with a three-point bending fixture and 250 N load cell. The polyamide component was pressed into plaques at 150 degrees Celsius under 6,779 N/m of force for 3 minutes using a press. Steel shims having a thickness of 3.2 mm were placed on either side of the plaques to control thickness. Flex bars were nominally 10.2 cm by 0.63 cm. Prior to testing the plaques were conditioned at 22±2 degrees Celsius and 50±10% relative humidity for at least 40 hours. The testing was performed at 22.7 degrees Celsius and 51.5% relative humidity. The average of 3 samples was used to determine the flexural modulus of the polyamide component.

The first polyamide resin of the polyamide component is a conventional, thermoplastic co-polyamide resin having a melt temperature from 90 degrees Celsius to 100 degrees Celsius, preferably from 92 degrees Celsius to 98 degrees Celsius, and more preferably from 94 degrees Celsius to 96 degrees Celsius under the ISO 11357-1/-3 standard. The first polyamide resin has a density in excess of 1000 kg/m$^3$ under the ISO 1183 standard. The first polyamide resin has a melt volume-flow rate from 90 to 120 cm$^3$/10 min (160 degrees Celsius; 2.16 kg), preferably from 95 to 110 cm$^3$/10 min under the ISO 1133 standard. The first polyamide resin also has a melt volume-flow rate from 120 to 140 cm$^3$/10 min (160 degrees Celsius; 2.16 kg), preferably from 125 to 135 cm$^3$/10 min under the PSI Method ID 906 Rev. 8 standard, which is congruent with the ASTM D1238013 Procedure A standard, as determined with a Tinius Olsen MP 1200 extrusion plastometer, as available from Tinius Olsen TMC, Horsham, PA.

Figure 3A:
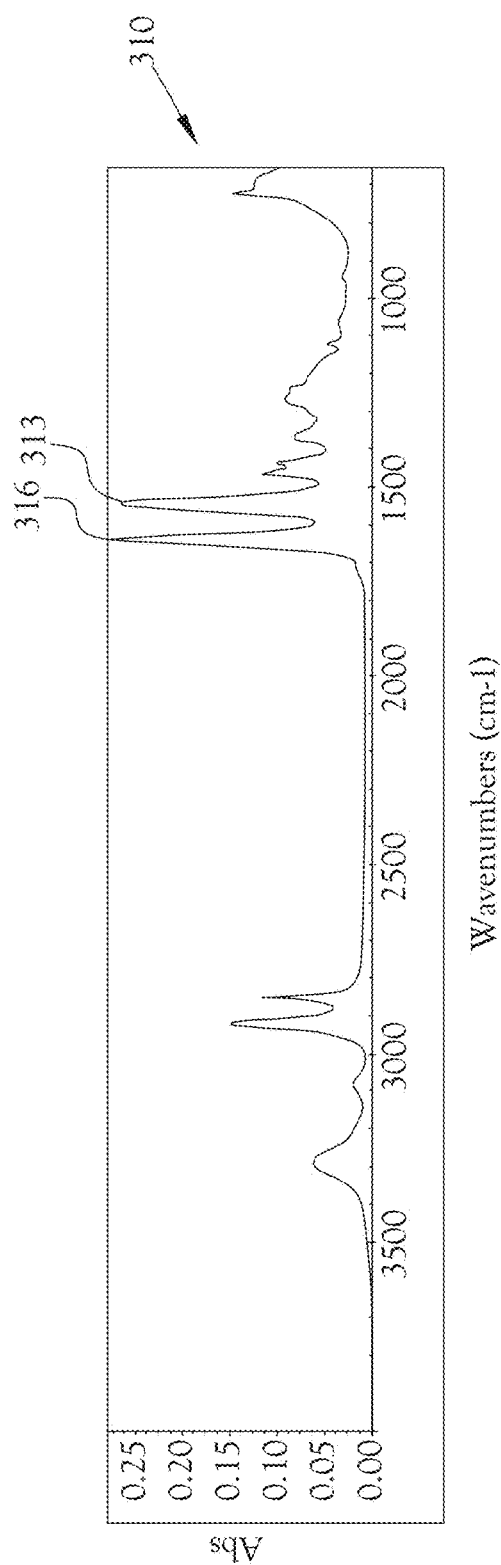
FIG. 3A and FIG. 3B provide Fourier-transform infrared (FTIR) spectra of the first and the second polyamide resins.
Figure 3B:
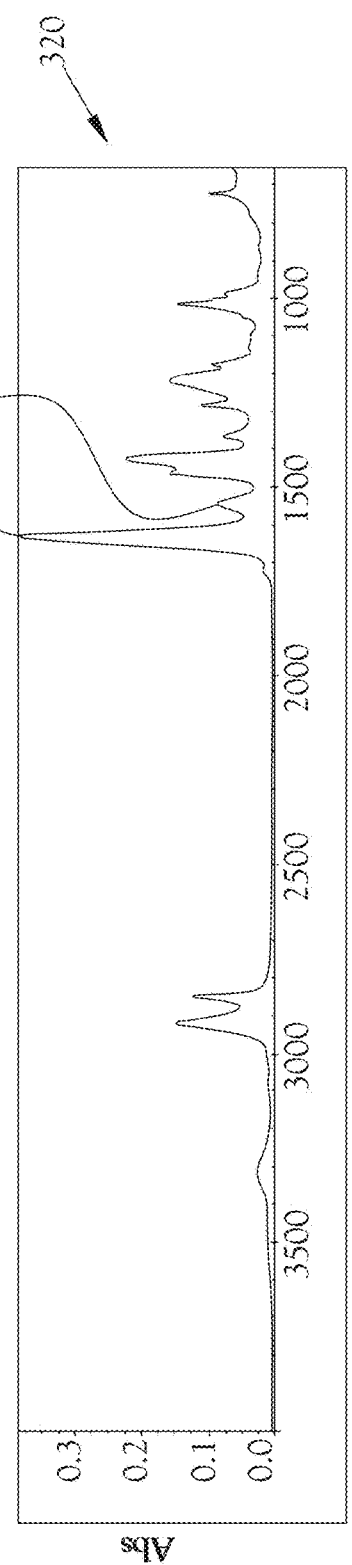

FIG. 3A and FIG. 3B provide Fourier-transform infrared (FTIR) spectra 300 of the first 310 and the second 320 polyamide resins. In FIG. 3A a preferred first polyamide resin shows strong (>0.2 ABS), substantially equivalent absorption peaks at both the 1650 cm$^{-1}$ 316 and the 1550 cm$^{-1}$ 313 wavenumbers in the FTIR, as shown in 310. One such resin suitable for use as the first polyamide resin is PLATAMID™ 2544, as available from Arkema. However, other resins meeting these criteria also may be used.

The second polyamide resin of the polyamide component is a modified thermoplastic co-polyamide resin. Preferably the second polyamide resin is a random copolymer including at least one of lactam and amino acid functional groups in the monomers used to form the resin. These lactam and amino acid functional groups may be considered to be of "biological origin" and provide the second polyamide with physical and adherence characteristics unlike those obtained from polyamides including diamine and dicarboxylic acid functional groups. More preferably, of the functional groups included in the monomers used to form the second polyamide resin, from 40% to 80% (weight of lactam and/or amino acid functionalized monomers/total monomer weight*100%) of the functional groups are lactam and/or amino acids.

The second polyamide resin has a melt temperature from 98 degrees Celsius to 115 degrees Celsius, preferably from 102 degrees Celsius to 110 degrees Celsius, and more preferably from 105 degrees Celsius to 107 degrees Celsius under the ISO 11357-1/-3 standard. The second polyamide resin has a density in excess of 1000 kg/m$^3$ under the ISO 1183 standard. The second polyamide resin has a melt volume-flow rate from 20 to 30 cm$^3$/10 min, preferably from 22 to 26 cm$^3$/10 min under the ISO 1133 standard. The second polyamide resin also has a melt volume-flow rate from 30 to 42 cm$^3$/10 min (160 degrees Celsius; 2.16 kg), preferably from 35 to 39 cm$^3$/10 min under the PSI Method ID 906 Rev. 8 standard, which is congruent with the ASTM D1238013 Procedure A standard, as determined with a Tinius Olsen MP 1200 extrusion plastometer, as available from Tinius Olsen TMC, Horsham, PA.

In reference to FIG. 3B, a preferred second polyamide resin shows a strong (<0.2 ABS) peak at the 1650 cm$^{-1}$ wavenumber 326, but lacks a strong peak at the 1550 cm$^{-1}$ wavenumber 323 in FTIR spectra 320. The second polyamide resin preferably has an at least 1:3, preferably an at least 1:4, and more preferably an approximately 1:5 intensity difference in the absorption peaks when comparing the 1550 cm$^{-1}$ 323 peak to the 1650 cm$^{-1}$ 326 peak. Thus, the 1650 cm$^{-1}$ 326 peak is at least three times stronger than the 1550 cm$^{-1}$ 323 peak observed for the second polyamide resin. As the 1650 cm$^{-1}$ 326 peak is characteristic of carbonyl stretching, the second polyamide resin maintains similar carbonyl stretching to the first polyamide resin at the 1650 cm$^{-1}$ wavenumber 326, but lacks the 1550 cm$^{-1}$ 323 cooperative mode of the first polyamide resin. These differences in the FTIR spectra between the first and second polyamide resins are believed attributable to the lactam and amino acid function groups present in the monomers forming the second polyamide disrupting the 1550 cm$^{-1}$ 323 cooperative stretching mode. One such resin suitable for use as the first polyamide resin is PLATAMID™ 2592, as available from Arkema. However, other resins meeting these criteria also may be used.

The polyamide component of the multi-phasic polymer blend preferably includes more of the second polyamide resin by weight than the first polyamide resin. The first polyamide resin is included to lower the melting point of the multi-phasic polymer blend into the desired 98-102 degree Celsius range; however, an excess of the first polyamide resin in relation to the second can adversely affect the cured bonding strength of the multi-phasic polymer blend. To balance these competing factors, the ratio of the first polyamide resin to the second polyamide resin present in the multi-phasic polymer blend is approximately 1:3 by weight, with deviations for each component up to 10% by weight being included, and with deviations for each component of up to 5% by weight being preferred, thus 1:3±10% by weight or 1:3±5% by weight.

While having a similar density and an approximately 10-degree Celsius higher melt temperature in relation to the first polyamide resin, the second polyamide resin has a substantially lower melt volume-flow rate of 20-30 (second polyamide resin) versus 90-120 (first polyamide resin) than the first polyamide resin as measured under the ISO 1133 standard. Thus, the ratio of melt volume-flow rates for the second to the first polyamide resins is from 1:2 to 1:6, preferably from 1:4 to 1:6. The significantly lower melt volume-flow rate of the second polyamide resin signifies that the polymer chains making up the second polyamide resin are longer, thus of higher number average molecular weight, than the polymer chains of the first polyamide resin. When combined with the first polyamide resin, the second polyamide resin reduces the likelihood that the first polyamide resin will crystalize during melting and thus that the multi-phasic polymer blend will delaminate from the outer layer or the substrate after cooling.

It is believed that if the first polyamide resin were to substantially crystallize during melting within the 98-100 degrees Celsius temperature range, the melting temperature of the first polyamide resin would rapidly and significantly increase during application of the edge banding. This rapid and significant melting temperature increase in the first polyamide resin component of the inner layer would create both liquid and solid phases in the inner layer during application to the substrate. The in-situ formation of solids after initial melting would inhibit proper penetration of the inner layer blend into the pores of the substrate, and thus adhesion with the substrate. The reduced penetration and lack of phase homogeneity of the inner layer would lead to delamination of the outer layer from the substrate after cooling. Non-multi-phasic blend edge banding adhesives address this potential issue using 140+ degree Celsius application temperatures that prevent solid formation even if one or more resins crystallize after initial melting. While this "brute force" solution substantially reduces the likelihood of delamination, the 140+ degree Celsius temperatures create the disadvantages previously discussed of burning, thus reducing the radius that may be obtained without guttering and gapping.

The differences in the 1550 cm$^{-1}$ wavenumber absorption band and the melt volume-flow rate between the first and second polyamide resins are believed to be factors giving rise to the unexpected performance properties of the multi-phasic polymer blend during application of the edge banding to a substrate as discussed further below regarding synergistic operation of the outer and inner edge banding layers.

The polyolefin component of the multi-phasic polymer blend includes one or more polyolefins and optionally a narrowband energy adsorber. The polyolefin component has a softening temperature of approximately 140 degrees Celsius and a processing temperature of approximately 180-200 degrees Celsius. While different polyolefin resins may be used in the multi-phasic blend as the polyolefin component, one suitable polyolefin resin is JOWAT-TOPTHERM™ LT hot melt adhesive as available from Jowat, High Point, NC.

The polyolefin component preferably includes a narrowband IR energy adsorber to enhance energy adsorption into the multi-phasic blend from an IR diode laser used to iridate the inner layer of the edge banding for contour application. Thus, the narrowband energy adsorber of the polyolefin component is preferably different than the energy adsorber of the outer layer, as the energy adsorber used in the polyolefin component preferably is optimized for the narrow wavelength output of the IR laser as opposed to being intended for use with the broader wavelength output from an IR lamp or non-laser source as is the energy adsorber used in the outer layer. Furthermore, the narrowband energy adsorber of the polyolefin component preferably has a smaller particle size than the outer layer energy adsorber or the narrowband energy adsorber may take on a liquid form before or during application of the edge banding to prevent flow interference with the multi-phasic blend entering the pores in the substrate.

The modified polypropylene component of the multi-phasic polymer blend preferably includes at least one maleic-anhydride derivatized polypropylene. Preferably, the derivatization is a graft modification the polypropylene with maleic anhydride. The modified polypropylene component of the multi-phasic polymer blend preferably includes two different maleic-anhydride derivatized polypropylene resins, with a second resin having a lower melting temperature than the first resin. While the cured bonding strength of the first modified polypropylene resin is preferred, the lower melting temperature of the second modified polypropylene resin assists in lowering the melting point of the multi-phasic polymer blend into the desired 98-102 degree Celsius range. To balance the competing factors of bonding strength and lower melting temperature, the ratio of the first maleic-anhydride derivatized polypropylene resin to the second maleic-anhydride derivatized polypropylene resin present in the multi-phasic polymer blend is approximately 3:1 by weight, with deviations for each component up to 10% by weight being included, and with deviations for each component of up to 5% by weight being preferred, thus 3:1±10% by weight or 3:1±5% by weight.

The first maleic-anhydride derivatized polypropylene resin has a melting temperature from 160 to 170 degrees Celsius under the ASTM D3418 test protocol of the ISO 3146 standard; and a melt flow rate at 190 degrees Celsius of 47 to 53 g/10 minutes under the ASTM D1238 test protocol of the ISO 1133 standard. One example of such a first maleic-anhydride derivatized polypropylene resin is sold under the brand name FUSABOND™ P613, as available from DuPont.

The second, lower melting maleic-anhydride derivatized polypropylene resin has a melting temperature from 130 to 135 degrees Celsius under the ASTM D3418 test protocol of the ISO 3146 standard; and a melt flow rate at 160 degrees Celsius of 20 to 24 g/10 minutes under the ASTM D1238 test protocol of the ISO 1133 standard. One example of such a second maleic-anhydride derivatized polypropylene resin is sold under the brand name FUSABOND™ P353, as available from DuPont.

The modified polypropylene component serves to allow the polyamide and polyolefin components of the multi-phasic polymer blend to blend and not separate during preparation and adhesion of the edge banding to the substrate, thus allowing a portion of the improvement in performance observed for the multi-phasic blend over conventional polyolefin adhesives. The polyamide component provides a hardness and prevents shrinking of the curing inner layer, while the polyolefin component provides flexibility and enhanced adhesion under stress to the cured inner layer. Thus, the combination provides a non-gapped, and non-guttered seam to the edge banding when cured as the polyamide component reduces cooling shrinkage, and thus guttering, while the polyolefin component has the flexibility to fill any gaps that could form during and after application of the edge banding.

Other constituents of the multi-phasic polymer blend preferably include ethylene acrylic acid (EAA) copolymers and wax, but other or no other constituents may be used. When EAA is used, the EAA preferably includes approximately 15% acrylic acid functionality. Suitable EAA copolymers for use as other constituents are available from Honeywell as the A-C™ series of EAA copolymers having acid numbers (mg KOH/g) of 150 and below. When included, the wax is chosen to reduce the melt-index of the multi-phasic polymer blend at the point of initial melting, thus enhancing flowability of the melted multi-phasic polymer blend during application of the edge banding to the substrate.

The ratio of the polyamide component to the polyolefin component to the modified polypropylene component of the multi-phasic polymer blend is approximately 2:1:1 by weight, with deviations for each component up to 10% by weight being included, and with deviations for each component of up to 5% by weight being preferred, thus 2:1:1±10% by weight or 2:1:1±5% by weight. The blend may include the other constituents up to approximately 8% total weight, while maintaining the approximately 2:1:1 weight ratio of the polyamide, polyolefin, and modified polypropylene components. The blend also may include additional narrowband IR energy adsorbers not localized in the polyolefin component. These ratios permit the polyamide component to provide the desired hardness to the cured edge banding while the polyolefin component provides the flexibility to the cured edge banding to prevent delamination from the substrate at temperature extremes.

The inner edge banding layer formed by the multi-phasic polymer blend is preferably from 0.1 millimeter (mm) to 0.5 mm, more preferably from 0.2 to 0.4 mm in thickness. Thus, preferably 0.1 mm to 0.5 mm of the multi-phasic polymer blend resides between the outer polypropylene component of the edge banding and the substrate and forms a visible portion of the edge banding. This thickness may be altered in response to the porosity of the substrate to which the edge banding is bonded.

Synergistic Operation of Outer and Inner Edge Banding Layers

During application of the edge banding to substrate contours at least two energy sources are preferred. A first energy source applies energy primarily to the outer side of the outer layer—the side of the outer layer away from the substrate and not in contact with the inner layer. As previously described, this first energy source preferably is a relatively broadband IR emitter, such as a lamp or other non-laser source. A second narrowband IR energy source applies energy primarily to the inner side of the inner layer—the side of the inner layer contacting the substrate during application of the edge banding. As previously described, this second energy source preferably is a relatively narrow wavelength emission IR laser. A preferable IR laser is an IR diode laser having an emission wavelength from 900 to 1000 nanometers that is preferably operated from 300 to 350 Watts. Optional energy sources may be used in addition to these two, such as a second IR lamp that irradiates the inner layer in combination with the relatively narrow wavelength source.

The broadband energy adsorber, such as the previously described talc, as present in the polypropylene component of the outer layer is believed to enhance the heat adsorption properties of the outer layer so the outer layer assists in reducing the tendency of the outer layer to draw heat from the inner layer during the post-application cooling of the edge banding to the substrate. This reduction in heat removal from the inner layer into the outer layer during cooling is believed to occur even though during application of the edge banding substantially more energy is applied to the inner multi-phasic blend than to the outer propylene component. Thus, by using an energy adsorber in the polypropylene component with the capacity to increase the heat capacity of the outer layer, heat may be stored in the outer layer during application of the edge banding that continues to flow into the inner layer during cooling and adhesion of the inner layer to the substrate. Thus, while adsorbing more energy during application of the edge banding, the multi-phasic blend is believed to cool at an increased rate in relation to the outer layer during post-application cooling. In contrast, conventional edge banding often has an outer layer that draws heat from the inner layer during cooling. This difference significantly affects the ability of the described edge banding to substantially eliminate gapping during higher speed application, especially around radii.

The broadband energy adsorber present in the polypropylene component of the outer layer also allows the outer layer to adsorb and retain more heat for a longer time than conventional outer layers. The increased heat, and especially the increased heat for a longer time after application of the edge banding is believed to reduce the tendency of the outer layer to restraighten after being bent around a contour, thus reducing gaps formed from the outer layer pulling away from the substrate.

The broadband energy adsorber in the polyolefin component of the multi-phasic blend is selected to provide the desired melt and flow to the multi-phasic polymer blend for contour application with a 32-38 Joule/cm$^2$ energy input window from the second energy source, which is significantly lower and wider than the 48-50 Joule/cm$^2$ energy input window typically required for non-multi-phasic blends to sufficiently melt, but not burn. Thus, the outer layer in combination with the multi-phasic blend of the inner layer allows application of the edge banding to substrate contours at an approximate 20% to 30% lower energy input in relation to the 48-50 Joule/cm$^2$ non-multi-phasic blends.

Translating input Joules/cm$^2$ to melting temperatures, the multi-phasic blend sufficiently melts for contour adhesion from 98 to 102 degrees Celsius, where non-multi-phasic blend edge banding adhesives generally melt sufficiently for contour adhesion at 140+ degrees Celsius. As the polyolefin has a melting temperature in the 160-degree Celsius range and the polyamides have melting temperatures in the 90-degree Celsius range, the multi-phasic blend starts to melt around 90-degrees Celsius, but will not burn until the temperature exceeds 160 to 180-degrees Celsius. Thus, the polyolefin component of the multi-phasic blend is believed to function as a type of heat sink at the molecular level to prevent burning when the edge banding application machine slows or otherwise delivers more energy to an area of edge banding than intended. This 90-degree Celsius to 160-degree Celsius or 180-degree Celsius "non-burning" operating range is an unexpected benefit from the multi-phasic polymer blend.

The wide variance in melting temperatures of the multiple constituents of the multi-phasic blend raises the question of how the multi-phasic blend sufficiently melts for contour adhesion in the 98 to 102-degree Celsius temperature range. For example, the multi-phasic blend includes: polyamides that melt at 90-100 and at 98 to 115 degrees Celsius; a polyolefin component that melts at approximately 180-200 degrees Celsius; and modified polypropylenes that melt at 160-170 and at 130-135 degrees Celsius. Thus, only the polyamides would be thought to melt at the edge banding application temperature range.

The ability of the multi-phasic blend to sufficiently melt for contour adhesion from 98 to 102 degrees Celsius is believed attributable to an effect other than temperature dependent physical melting of the individual polymer resins—chemical solubilization. It is believed that by combining lower and higher melting versions of similar resins in the proper ratios and by combining the different resin types in the proper ratios, in situ solvation or partial solvation of the higher melting resins into the lower melting resins occurs during application of the edge banding to the substrate. Thus, the polyamide in combination with the optional EAA and wax are believed to carry the polyolefin and modified polypropylenes into the pores of the substrate after the melting and solubilization or partial solubilization occurs.

The differences in adhesion melting temperatures and energy input windows in relation to conventional edge banding adhesives translate into substantial production advantages during application of the described edge banding to the substrate. The multi-phasic blend has an energy input window for contour adhesion from 32-38 Joules/$cm^2$, thus an operating energy window for contour adhesion of six Joules/$cm^2$. In contrast, non-multi-phasic blends have an approximate 48-50 Joule/$cm^2$ energy input window for contour adhesion, which provides an operating energy window for contour adhesion of only two Joules/$cm^2$ where sufficient melting for contour adhesion occurs without burning. Thus, the multi-phasic polymer blend provides approximately three times the operating energy window of non-multi-phasic blend edge banding adhesives—an approximate 300% increase in the energy operating window for contour adhesion.

Both the wider, six versus two Joule/$cm^2$ contour adhesion energy window and the substantially lower 98-102 versus 140+ degree Celsius contour adhesion melt temp of the described edge banding provide significant practical advantages when applying the edge banding to substrate contours. The two-Joule/$cm^2$ energy window of non-multi-phasic blend systems require tight control of edge banding contour application speed and substantial slowing around corners to prevent the energy input from dropping below the narrow, approximately two-Joule/$cm^2$ energy input window along the entire length of edge banding. In contrast, the wider, approximately six-Joule/$cm^2$ energy input window of the described edge banding permits substantially more variance in contour application speed and much less slowing around corners to maintain the six Joule/$cm^2$ energy window along the edge banding.

A practical benefit of the approximately six Joule/$cm^2$ contour application energy window is that the relatively wide energy window permits edge banding application around corners to proceed at approximately twice the application speed as provided by the two-Joule/$cm^2$ energy window. For example, a contour edge banding machine using conventional hot melt adhesive, or a non-multi-phasic blend inner layer conventionally slows from an approximate speed of 8 meters/minute to approximately 2 meters/minute to provide enough energy to prevent gapping and guttering around a radii of approximately 30 mm when applying edge banding having a 3 mm thickness. Replacing the conventional hot melt adhesive or non-multi-phasic blend inner layer with the described multi-phasic blend inner layer only requires slowing from the 8 meters/minute speed to approximately 4 meters/minute to provide enough energy to prevent gapping and guttering around the same approximately 30 mm radii with the 3 mm edge banding. This represents an approximate 30% reduction in the slowing required to turn the radii, which allows the radii to be turned nearly twice as fast, a significant benefit from a production efficiency perspective.

Another practical benefit of the approximately six Joule/$cm^2$ contour application energy window is that the relatively wide energy window requires less up-front programming and configuration time for the contour edge banding machine. In attempting to maintain the two-Joule/$cm^2$ energy window under all operating conditions, detailed programming for each batch of edge banding and for each type of substrate is often required. This need to reconfigure the detailed programming to best maintain the two-Joule/$cm^2$ energy window for each production change is a significant impediment to efficient production.

Furthermore, from an energy consumption perspective, the 48-50 Joule/$cm^2$ energy input required to achieve the 140+ degree Celsius application temperature for contour banding requires a nearly 500-Watt constant power consumption by the diode laser. In contrast, the 32-38 Joule/$cm^2$ energy requirement of the multi-phasic blend requires approximately 310 to 350 Watts of power. The lower and expanded energy window also permits more variance in the power supply driving the laser without inconsistent contour banding results, a longer service life for the laser, and a nearly 30% reduction in power consumption by the laser—while providing a more consistent, and thus superior finished product. While contour application has been discussed, the straight-line edge banding application energy input required for the multi-phasic blend drops to approximately 10 to 16 Joule/$cm^2$ from the contour requirement of 32-38 Joule/$cm^2$, thus substantially reducing the energy required in relation to conventional straight-line applications. If reduced power consumption is a consideration to meet Green Energy production standards, the described multi-phasic blend can be a significant factor in achieving the desired production energy consumption goal in both contour and straight-line applications, in addition to the savings arising from less frequent laser replacement.

The synergistic behavior of the outer polypropylene component in combination with the inner multi-phasic polymer blend during application of the edge banding provides substantially no gapping or guttering between the edge banding and the substrate when the edge banding bends around curves in the substrate. Thus, overcoming the problem of conventional edge banding relying on a polypropylene hot-melt adhesive inner layer and a polypropylene outer layer, where the flexural modulus of the combined inner and outer layers is too high to prevent gapping and/or guttering around curves in the substrate. The outer polypropylene component in combination with the inner multi-phasic polymer blend may provide a consistently sealed edge to a substrate around substrate curves having radii from 20 to 30 mm and higher, thus providing a consistently sealed edge for the 20 to 25 mm radii span that is not achievable with conventional edge banding adhesives and for the 25 to 30 mm radii span where conventional edge banding adhesives become inconsistent for the 2.7 mm and thicker edge banding.

Another benefit of the multi-phasic blend inner layer is the significantly reduced cooling required after application of the edge banding to the substrate before the edge may be tooled. After edge banding is applied to the edge of a substrate, it is often desirable to tool the inner layer and/or the outer layer to provide a more finished look. Tooling of the edge banding is generally performed with a high-speed rotary cutting tool, such as used with a mill or router. If the adhesive of the inner layer has not sufficiently hardened before the edge banding is subjected to tooling, the mechanical force of the tool may dislodge the edge banding from the edge of the substrate, thus accentuating or creating guttering and/or gapping, and may leave chatter marks formed by chunks of adhesive being pulled as opposed to being cut from the edge banding itself.

In this context, the production parameter of interest is the cooling required from the time the hot edge banding leaves the heat of the application machine until the edge banding cools sufficiently for tooling. For conventional hot melt adhesive layers, high speed fans are used to increase the cooling rate after the hot edge banding is applied. Replacing the conventional hot melt adhesive with the described multi-phasic blend inner layer only requires from 5 to 20 seconds, preferably from 5 to 10 seconds, of atmospheric cooling at approximately 25 degrees Celsius, without high speed fans or other active cooling devices to achieve the necessary hardness for high speed rotary tooling of the inner layer. This elimination of active cooling provides additional energy savings to meet Green Energy production standards. Thus, the described multi-phasic blend adhesive layer lacks the need for post-application active cooling and can be a significant factor in achieving desired production energy consumption goals.

Another benefit of the multi-phasic blend inner layer is the significantly reduced "stickiness" of the inner layer and the accompanying reduction in the high-speed rotary cutting tool ejecting waste inner layer onto the top and bottom surfaces of the substrate, requiring solvent clean up. Neither must the production line be stopped as regularly to clean the waste inner layer from the cutting tool. The substantial elimination of solvent clean-up of the top and/or bottom of the substrate after application of the edge banding makes production more environmentally friendly, while increasing production efficiency do to less workflow stoppage.

Thus, the synergistic behavior of the outer polypropylene component in combination with the inner multi-phasic polymer blend provides a smooth, substantially flush, non-gapped, tightly sealed, non-smearing, non-sticky, and non-yellowing inner edge bonding layer between the outer layer of the edge banding and substrate contours. The inner layer that is visible between the substrate and the outer layer may be readily cleaned and approximates the look and feel of the top, bottom and front edge faces of the outer layer to which it is bound. Cleanability, arising from the lack of gapping and guttering, is a significant attribute for the health care and the food service industries, where sterilization through surface cleaning is desired. The multi-phasic polymer blend may be color matched with known additives to approximate the color of the substrate or the outer polypropylene component. Benefits may be obtained from the multi-phasic polymer blend when used on both straight-line and contour edge band machines. The multi-phasic polymer blend also yields superior bond strength and hardness in comparison to conventional polypropylene hot-melt edge banding adhesives.

Edge Banding

The edge banding may be prepared in at least three different forms for different applications. For non-IR activated use, a non-IR activated edge banding may be prepared by eliminating the broadband IR energy adsorber from the outer layer and the narrowband IR energy adsorber from the multi-phasic blend forming the inner layer. This non-IR formulation may be used for straight-line application with conventional application techniques. The non-IR formulation also may be used for contours if hot air, plasma, UV, or a different non-IR energy source is used that can attain the previously discussed 98 to 102-degree Celsius temperature range during application of the edge banding. For non-narrowband IR activated use, a non-narrowband IR edge banding may be prepared by including the broadband IR energy adsorber in the outer layer, and by replacing or enhancing the narrowband IR energy adsorber in the inner layer with a broadband energy adsorber. This non-narrowband IR formulation may be used for straight-line application with broadband IR, and in some contour applications where the broadband IR energy source can attain the previously discussed 98 to 102-degree Celsius temperature range during application of the edge banding. For both broadband and narrowband IR activated use, and as previously discussed, the edge banding may be prepared by including the broadband IR energy adsorber in the outer layer and by including the narrowband IR energy adsorber in the inner layer. As previously discussed, the narrowband IR energy adsorber may be localized in a component of the inner layer multi-phasic blend, distributed throughout the blend, or both, thus having a higher energy adsorber content in a component in relation to the adsorber content throughout the blend.

The edge banding may be used as an edge trim, but is not limited to use on the edges of a substrate. The multi-phasic polymer blend may be applied to the outer layer polypropylene component in a second step or may be coextruded with the polypropylene component in a single process. Thus, the inner and outer layers of the edge banding may be adhered before the edge banding is adhered to the substrate or while the edge banding is being adhered to the substrate.

The edge banding has a total thickness from 1.5 mm to 5 mm, preferably from 2 mm to 4 mm, and more preferably from 2.7 mm to 3.5 mm. However, other total thicknesses may be used depending on the application. The total thickness of the edge banding includes the thickness of the outer and inner layers.

Figure 2A:
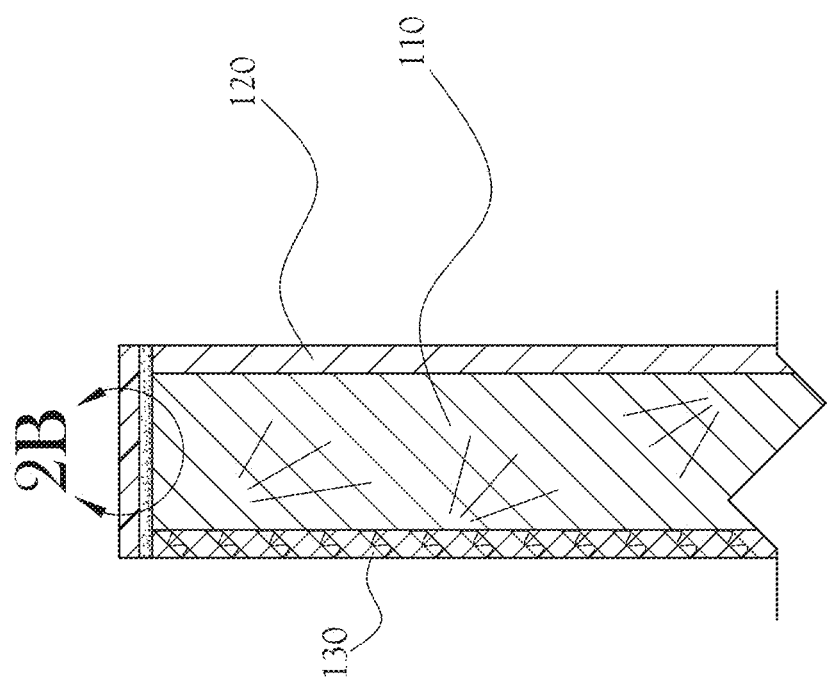
FIG. 2A shows a section representation of one edge of a substrate, such as a table top or other furniture surface, with the described edge banding.

FIG. 2A and FIG. 2B illustrate the described edge banding including an outer propylene component 141 and an inner multi-phasic polymer blend 145. FIG. 2A shows a section representation of one edge of a substrate 110, such as a table-top or other furniture surface, with the described edge banding. The substrate 110 is covered on the top by a layer 120 of HPL or LPL and on the opposite side by a layer 130 of plastic impregnated paper or similar material. The edge of the wood composite layer 110, seen in an enlarged representation in the inset of FIG. 2B, is bonded to the outer propylene component 141 by the inner multi-phasic blend 145 and lacks gapping or guttering.

The following examples illustrate one or more preferred embodiments of the invention. Numerous variations may be made to the following examples that lie within the scope of the invention.

EXAMPLES

Example 1: Preparation of the Polypropylene Component

The polypropylene resin is provided in pellet form. The resin is optionally combined with dry, super fine powdered talc in a high intensity Henschel mixer and thoroughly mixed. The mixture is then transferred into an extruder where the mixture is worked together and then extruded into outer layer pellets.

Example 2: Preparation of the Multi-Phasic Polymer Blend

The desired resins are provided in pellet form and are combined in the desired weights in a high intensity Henschel mixer, and mixed thoroughly. Depending on the application, additional narrowband IR energy adsorber may be added in addition to any narrowband IR energy adsorber present in the component resins. In other applications, a broadband IR energy adsorber may be added in place of or in addition to the narrowband adsorber. The mixture is then transferred into an extruder where the mixture is worked together and then extruded into inner layer pellets.

Example 3: Formation of the Edge Banding

The outer layer pellets from Example 1 and the inner layer pellets from Example 2 are loaded into separate extruders for coextrusion. In another aspect, the outer layer pellets from Example 1 are extruded into the desired shape of the outer layer and the inner layer pellets from Example 2 are then extruded onto the previously extruded outer layer.

The extruding temperature used for the outer layer pellets from Example 1 is in the 200 to 250 degrees Celsius range, while the extrusion temperature for the Example 2 inner layer pellets can be in the 150 to 200 degrees Celsius range if extruded in a second step onto a preexisting outer layer. The 200 to 250 degrees Celsius extrusion range can be used for both pellet types when the outer and inner layers are coextruded.

Example 4: Adhering the Edge Banding to a Wood Composite Substrate

Edge banding from Example 3 is loaded into an IR energy emitting edge banding machine. The energy emitting edge banding machine is equipped with a diode IR laser directed toward the inner side of the edge banding and an IR lamp directed toward the outer side of the edge banding. The laser is set to the 300 to 350 watt range. The edge banding machine may remain stationary for applying the multi-phasic blend edge banding to straight edges or have an articulating application head that moves to follow contours of the substrate.

Example 5: Comparison of Conventional to Described Edge Banding

Figure 4:
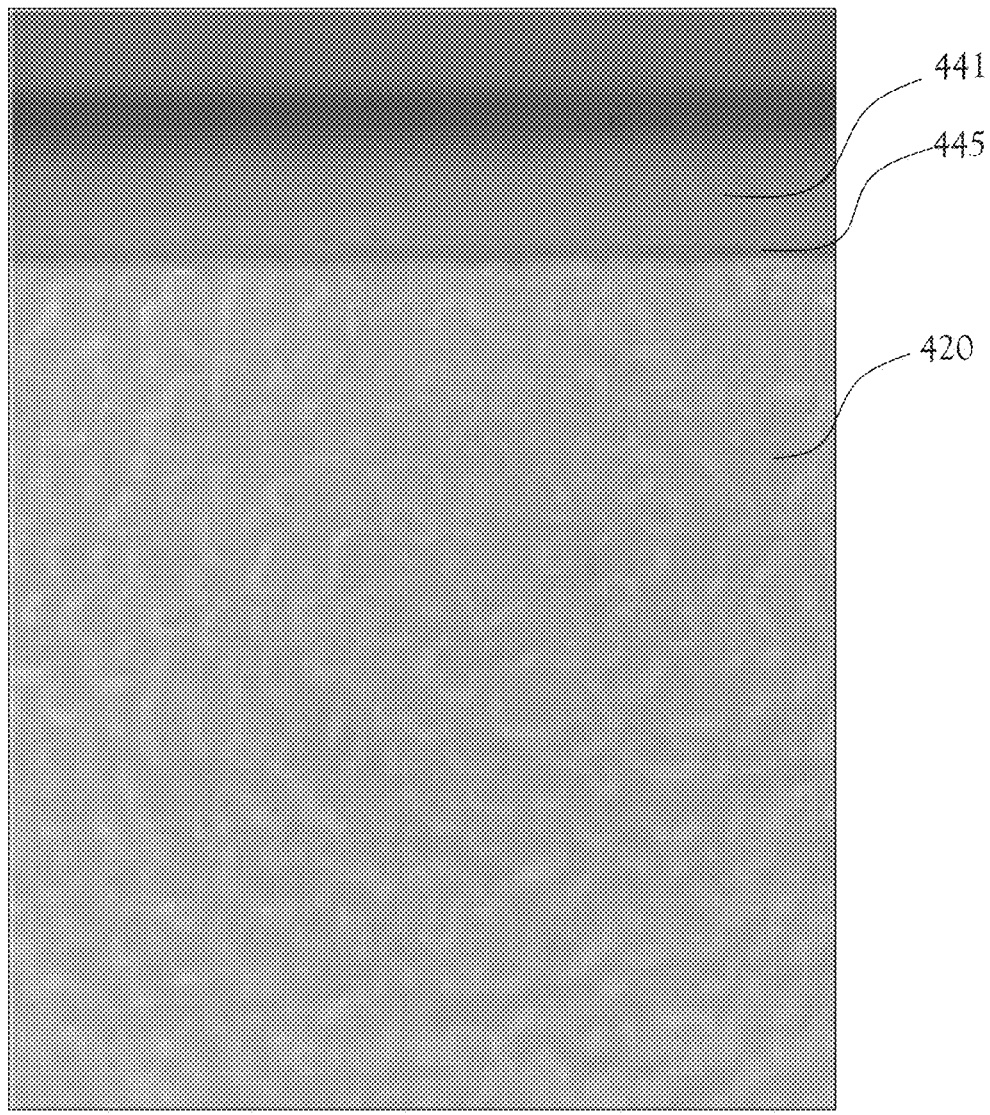
FIG. 4 is a photographic image showing edge banding applied without using the described multi-phasic blend as the inner adhesion layer.

FIG. 4 is a photographic image showing edge banding applied without using the described multi-phasic blend as the inner adhesion layer. As seen in the photo a dark line is present between substrate edge 420 and the outer layer 441 of the edge banding. The dark line follows the top of inner layer 445, reflecting a visible gutter is present that is visible as a dark line due to collected dirt and a different light reflectivity.

Figure 5:
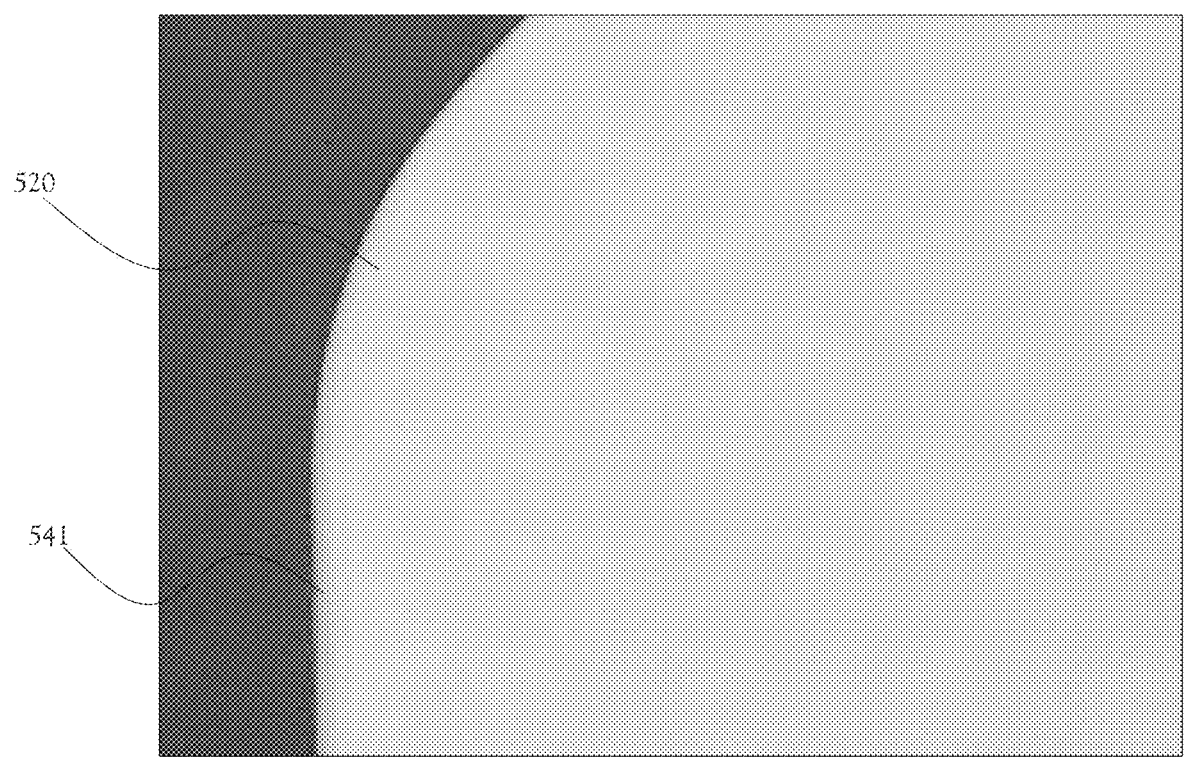
FIG. 5 is a photographic image showing edge banding applied using the described multi-phasic blend as the inner adhesion layer.

FIG. 5 is a photographic image showing edge banding applied using the described multi-phasic blend as the inner adhesion layer. As seen in the photo a dark line is not present between substrate edge 520 and the outer layer 541 of the edge banding. Lacking a gutter to collect dirt and provide a different light reflectivity, the attachment of the outer layer 541 of the edge banding to the substrate edge 520 appears substantially seamless.

To provide a clear and more consistent understanding of the specification and claims of this application, the following definitions are provided.

Polyolefins are polymers formed from repeating olefin units (monomers) in the backbone. Such a polymer may be referred to as a homo-polymer when the polymer is formed from a single monomer unit. Polyolefins are not generally considered grafted polymers as any side chains are made from the same monomer as the backbone.

Polyamides are polymers having repeating units joined by amide nitrogen bonds. A common polyamide is Nylon®. A co-polyamide includes two different monomers, where each monomer includes nitrogen. A co-polyamide has a backbone including the two different monomers, but lacks side chains, thus lacking the grafted side chains of a "grafted copolymer." While manufacturers may use different words, a "grafted co-polyamide" would be a polyamide having two different monomers in the backbone and side chains grafted to one or both of the monomers forming the backbone.

Grafted copolymers or polymers is a type of branched copolymer where the side chains (i.e., the grafts) are structurally distinct from the main chain of the polymer backbone. In order to form a grafted copolymer or polymer, at least two different units are required. One unit is required to form the backbone, while a different unit is required to form the side chains branching from the backbone. The units can be monomers or polymers.

Unless the context clearly dictates otherwise, where a range of values is provided, each intervening value to the tenth of the unit of the lower limit between the lower limit and the upper limit of the range is included in the range of values.

While various aspects of the invention are described, it will be apparent to those of ordinary skill in the art that other embodiments and implementations are possible within the scope of the invention. Accordingly, the invention is not to be restricted except in light of the attached claims and their equivalents.

What is claimed is:

1. A multi-phasic polymer blend for adhering an outer edge banding layer to a substrate, the blend comprising:
a polyamide component comprising first and second polyamide resins,
where the second polyamide resin is a random copolymer including at least one of lactam and amino acid functional groups in the monomers used to form the second polyamide resin;
a polyolefin component; and
a modified polypropylene component,
where the modified polypropylene component comprises a first modified polypropylene resin and a second modified polypropylene resin, where the first and the second modified polypropylene resins are different.

2. The blend of claim 1, the first polyamide resin having a melt temperature from 90 degrees Celsius to 100 degrees Celsius.

3. The blend of claim 1, the first polyamide resin having strong substantially equivalent peaks at both a 1650 cm$^{-1}$ and a 1550 cm$^{-1}$ wavenumber in an FTIR spectra.

4. The blend of claim 1, where the first polyamide resin does not substantially crystallize during melting within a 98-100 degrees Celsius temperature range.

5. The blend of claim 1, where from 40% to 80% of the monomers forming the second polyamide resin include functional groups selected from the group consisting of lactam functional groups, amino acid functional groups, and combinations thereof.

6. The blend of claim 1, the second polyamide resin having a melt temperature from 98 degrees Celsius to 115 degrees Celsius.

7. The blend of claim 1, the second polyamide resin having strong peak at a 1650 cm$^{-1}$ wavenumber, but lacking a strong peak at a 1550 cm$^{-1}$ wavenumber in an FTIR spectra.

8. The blend of claim 1, where a ratio of the first polyamide resin to the second polyamide resin is approximately 1:3±10% by weight.

9. The blend of claim 1, where a ratio of melt volume-flow rates for the second polyamide resin to the first polyamide resin is from 1:2 to 1:6.

10. The blend of claim 1, where polymer chains of the second polyamide resin are of higher number value molecular weight than polymer chains of the first polyamide resin.

11. The blend of claim 1, the polyolefin component further comprising at least one narrowband IR energy adsorber.

12. The blend of claim 1, the polyolefin component having a softening temperature of approximately 140 degrees Celsius.

13. The blend of claim 1, the modified polypropylene component comprising at least one maleic-anhydride derivatized polypropylene.

14. The blend of claim 1, where the second modified polypropylene resin has a lower melting temperature than the first modified polypropylene resin.

15. The blend of claim 1, the first modified polypropylene resin having a melting temperature from 160 to 170 degrees Celsius.

16. The blend of claim 1, the second modified polypropylene resin having a melting temperature from 130 to 135 degrees Celsius.

17. The blend of claim 1, where the ratio of the first modified polypropylene resin to the second modified polypropylene resin is 3:1±10% by weight.

18. The blend of claim 1, further comprising an ethylene acrylic acid polymer.

19. The blend of claim 18, the ethylene acrylic acid copolymer including approximately 15% acrylic acid functionality.

20. The blend of claim 1, where a ratio of the polyamide component to the polyolefin component to the modified polypropylene component is 2:1:1±10% by weight.

21. The blend of claim 1, further comprising at least one narrowband IR energy adsorber.

22. The blend of claim 1, further comprising at least one broadband IR energy adsorber.

23. The blend of claim 1, where the blend melts sufficiently for adhesion from 98 to 102 degrees Celsius.

24. A multi-phasic polymer blend for adhering an outer edge banding layer to a substrate, the blend comprising:
 a polyamide component having a melt temperature from 98 degrees Celsius to 108 degrees Celsius and a melt volume flow rate from 43 to 53 cm³/10 min (160 degrees Celsius; 2.16 kg);
 at least one IR energy adsorber;
 a polyolefin component; and
 a modified polypropylene component,
 where the modified polypropylene component comprises a first modified polypropylene resin and a second modified polypropylene resin, where the first and the second modified polypropylene resins are different.

25. The blend of claim 24, where the polyamide component has a flexural modulus of 185 MPa±16%.

26. The blend of claim 24, where the polyamide component includes a first polyamide resin having diamine and dicarboxylic acid functional groups in the monomers forming the first polyamide resin.

27. The blend of claim 26, where the polyamide component includes a second polyamide resin that is different from the first polyamide resin.

28. The blend of claim 27, the second polyamide resin including functional groups of biological origin in the monomers forming the second polyamide resin.

29. The blend of claim 26, the first polyamide resin having a melt temperature from 90 degrees Celsius to 100 degrees Celsius.

30. The blend of claim 26, where the first polyamide resin does not substantially crystallize during melting within a 98-100 degrees Celsius temperature range.

31. The blend of claim 27, the second polyamide resin having a melt temperature from 98 degrees Celsius to 115 degrees Celsius.

32. The blend of claim 27, where the ratio of the first polyamide resin to the second polyamide resin is approximately 1:3±10% by weight.

33. The blend of claim 27, where a ratio of melt volume-flow rates for the second polyamide resin to the first polyamide resin is from 1:2 to 1:6.

34. The blend of claim 27, where polymer chains of the second polyamide resin are of higher number value molecular weight than polymer chains of the first polyamide resin.

35. The blend of claim 24, the at least one IR energy adsorber comprising a narrowband IR energy adsorber.

36. The blend of claim 24, the at least one IR energy adsorber comprising a broadband IR energy adsorber.

37. The blend of claim 24, the polyolefin component further comprising a narrowband IR energy adsorber.

38. The blend of claim 24, the polyolefin component having a softening temperature of approximately 140 degrees Celsius.

39. The blend of claim 24, the modified polypropylene component comprising at least one maleic-anhydride derivatized polypropylene.

40. The blend of claim 24, where the second modified polypropylene resin has a lower melting temperature than the first modified polypropylene resin.

41. The blend of claim 24, the first modified polypropylene resin having a melting temperature from 160 to 170 degrees Celsius.

42. The blend of claim 24, the second modified polypropylene resin having a melting temperature from 130 to 135 degrees Celsius.

43. The blend of claim 24, where the ratio of the first modified polypropylene resin to the second modified polypropylene resin is 3:1±10% by weight.

44. The blend of claim 24, further comprising an ethylene acrylic acid copolymer.

45. The blend of claim 44, the ethylene acrylic acid copolymer including approximately 15% acrylic acid functionality.

46. The blend of claim 24, where a ratio of the polyamide component to the polyolefin component to the modified polypropylene component is 2:1:1±10% by weight.

47. The blend of claim 24, where the blend melts sufficiently for adhesion from 98 to 102 degrees Celsius.

* * * * *